Dec. 1, 1964  J. T. REECE  3,159,259
AUTOMATIC DEVICE FOR PURCHASING WASTE PAPER
Filed Jan. 21, 1964  6 Sheets-Sheet 1

INVENTOR
JOSEPH T. REECE
BY *Felix A. Russell*
ATTORNEY

Dec. 1, 1964   J. T. REECE   3,159,259
AUTOMATIC DEVICE FOR PURCHASING WASTE PAPER
Filed Jan. 21, 1964   6 Sheets-Sheet 2
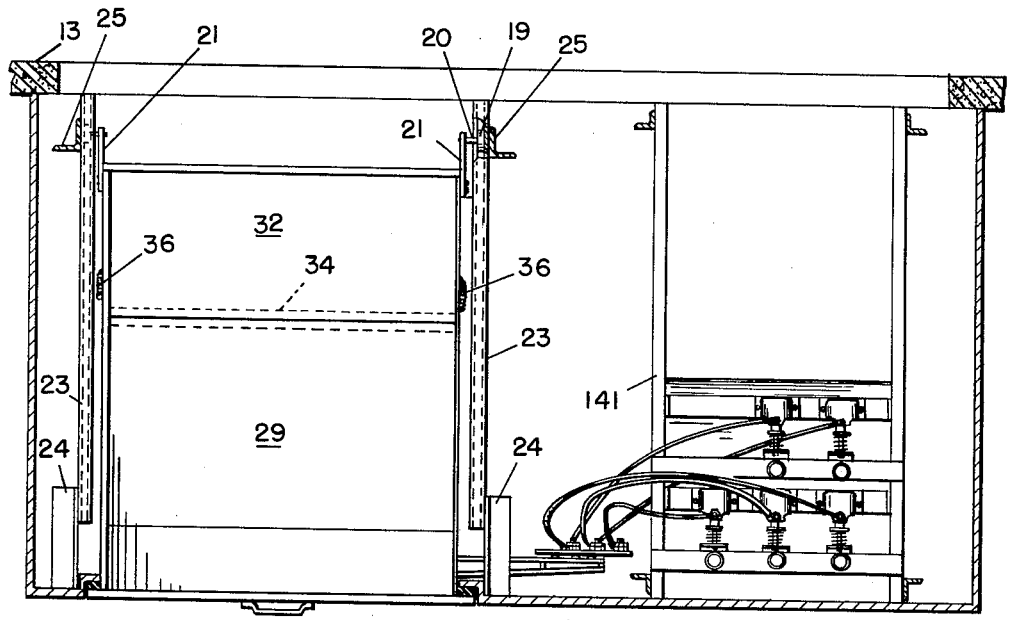
Fig. 3
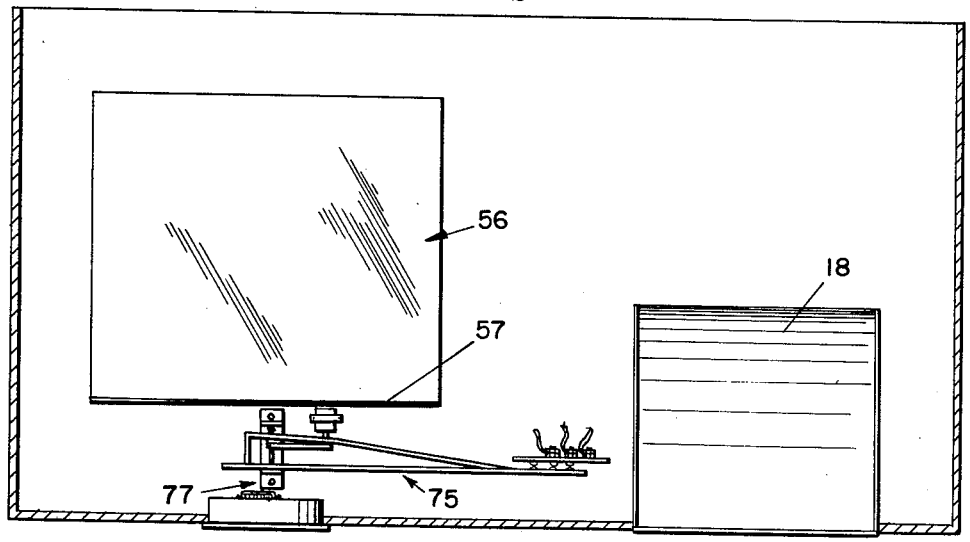
Fig. 4
INVENTOR
JOSEPH T. REECE
BY
ATTORNEY Dec. 1, 1964 J. T. REECE 3,159,259
AUTOMATIC DEVICE FOR PURCHASING WASTE PAPER
Filed Jan. 21, 1964 6 Sheets-Sheet 3

INVENTOR
JOSEPH T. REECE
BY *Felix A. Russell*
ATTORNEY

Dec. 1, 1964   J. T. REECE   3,159,259
AUTOMATIC DEVICE FOR PURCHASING WASTE PAPER
Filed Jan. 21, 1964   6 Sheets-Sheet 4

INVENTOR
JOSEPH T. REECE

BY *Felix A. Russell*

ATTORNEY

Dec. 1, 1964    J. T. REECE    3,159,259
AUTOMATIC DEVICE FOR PURCHASING WASTE PAPER
Filed Jan. 21, 1964    6 Sheets-Sheet 5
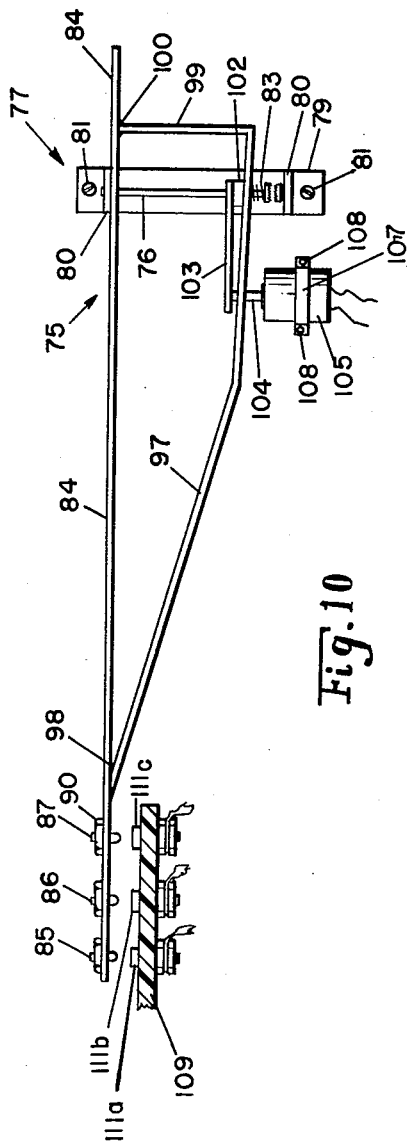
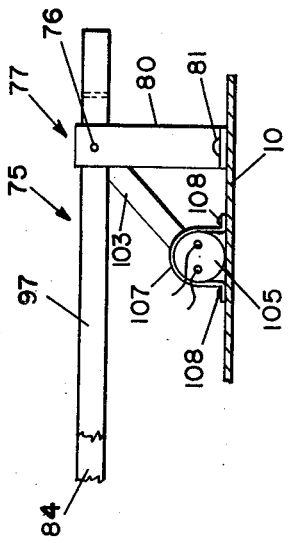
INVENTOR
JOSEPH T. REECE
BY *Felix A. Russell*
ATTORNEY Dec. 1, 1964   J. T. REECE   3,159,259
AUTOMATIC DEVICE FOR PURCHASING WASTE PAPER
Filed Jan. 21, 1964   6 Sheets-Sheet 6
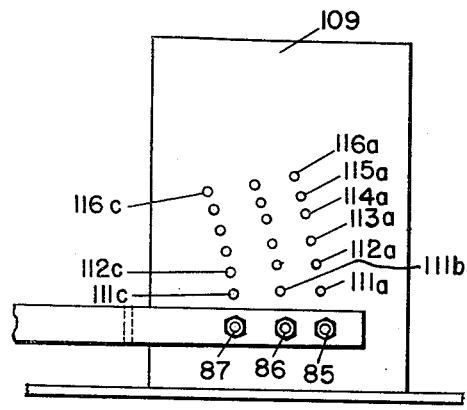
Fig. 9
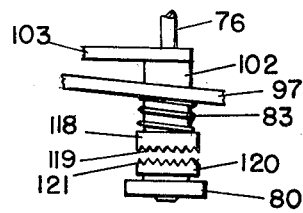
Fig. 10A
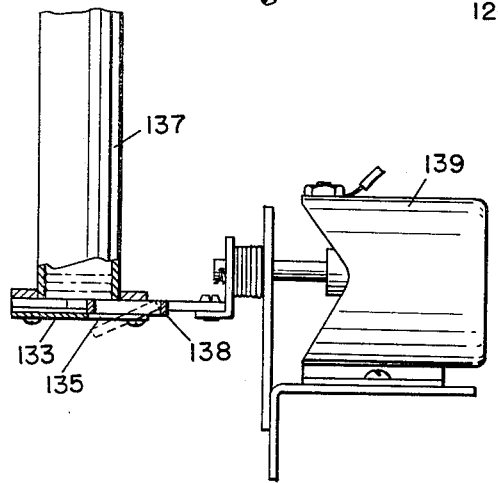
Fig. 11
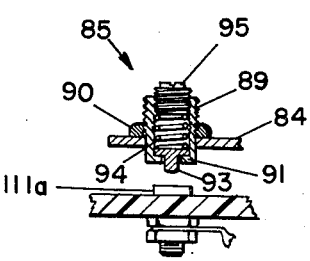
Fig. 14
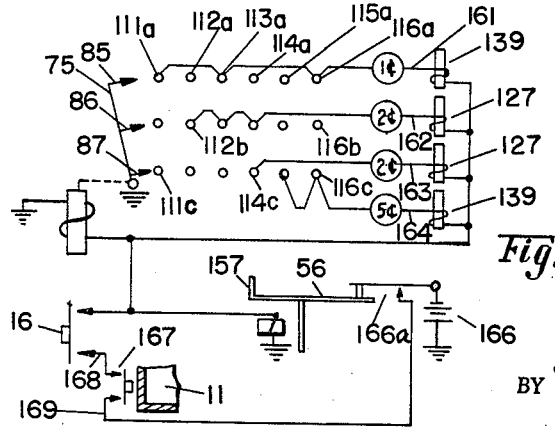
Fig. 12
Fig. 13
INVENTOR
JOSEPH T. REECE
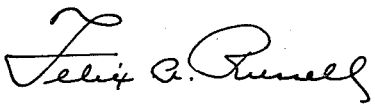
BY
ATTORNEY

United States Patent Office 3,159,259
Patented Dec. 1, 1964

3,159,259
AUTOMATIC DEVICE FOR PURCHASING WASTE PAPER
Joseph T. Reece, 302 10th St., Holloway Terrace, Newcastle, Del.
Filed Jan. 21, 1964, Ser. No. 339,288
11 Claims. (Cl. 194—4)

The present invention relates to an automatic device for purchasing waste paper such as old newspapers and it consists in the combinations, constructions and arrangements of parts hereinafter to be described and claimed.

The machine comprises a cabinet, a receiving drawer in the cabinet, a weighing platform mounted on a scale beneath the drawer, a weight indicating dial at the front of the cabinet, mechanism included in the scale for discharging the papers from the weighing platform, a switch arm actuated by the scale, coin dispensing mechanism controlled by the switch arm and an actuating button for simultaneously discharging the platform and causing the coin dispensing mechanism to discharge a payment determined by the weight on the platform.

It is an object of the invention to provide a machine of the character described which is relatively simple in construction yet effective and efficient in operation.

Another object of the invention is to provide a novel machine for the automatic purchasing of old newspapers.

Still another object of the invention is to provide, in a machine of the character set forth, novel means for dispensing coins in accordance with the weight of newspapers placed in said machine.

A further object of the invention is to provide, in a machine of the character set forth, novel weighing apparatus forming a part of the invention.

A still further object of the invention is to provide, in a machine of the character set forth, novel paper receiving means forming a part of the invention.

Various other objects, features and advantages of the invention will become apparent from the following specification considered in connection with the accompanying drawing forming a part hereof.

Referring to the drawing:

FIGURE 3 is a plan sectional view taken along the line 3—3 of FIGURE 1.

FIGURE 4 is a plan sectional view taken along line 4—4 of FIGURE 1.

FIGURE 9 is a fragmentary elevational view showing the switch arm and its associated contacts.

FIGURE 10 is a fragmentary plan view of the free end portion of the switch arm.

FIGURE 11 is a side elevational view, partly broken away, of a coin dispensing unit which simultaneously discharges two coins for each actuation, the dispensing unit being shown in its normal position.

FIGURE 12 is a view similar to FIGURE 11 showing a coin dispensing unit which discharges a single coin for each actuation, the dispensing unit being shown in its discharging position.

FIGURE 13 is a circuit diagram.

FIGURE 14 is an enlarged sectional view of one of the movable contacts and one of the stationary contacts associated with the switch arm.

Figure 1:
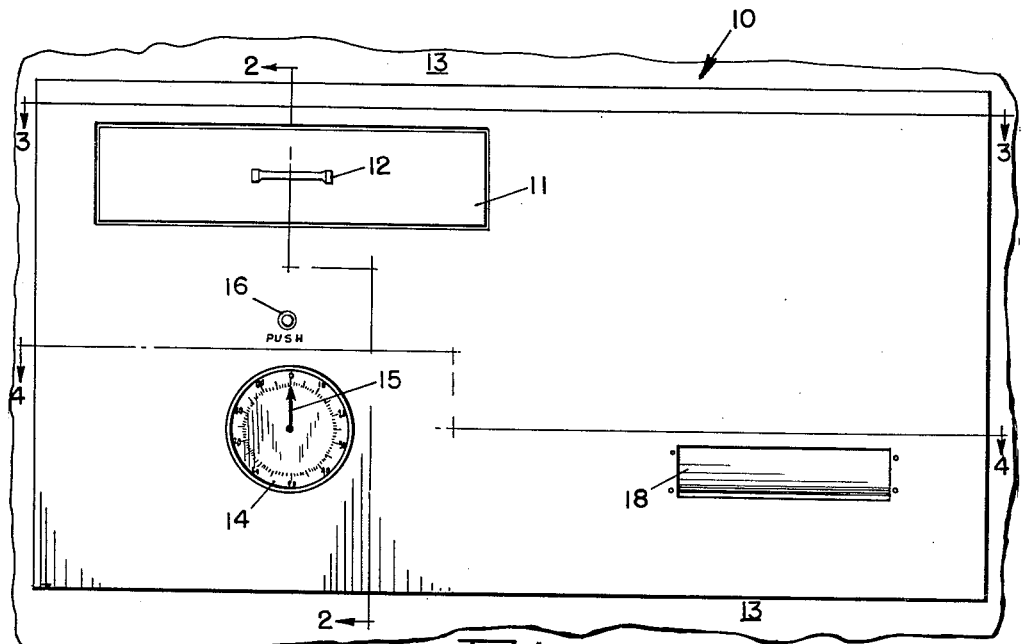
FIGURE 1 is a front elevational view of a purchasing machine embodying the invention.

Referring to FIGURE 1, the purchasing device comprises a cabinet designated generally as 10 which is open at its rear. Opening outwardly from the front of the cabinet 10 is a receiving drawer 11 the front of which is provided with a handle 12. The cabinet 10 is secured to a wall 13 thereby preventing unauthorized access through its open rear. Wall 13 is suitably apertured to permit gravity transfer of papers to a storage space in back of wall 13 and below the cabinet 10. Below the drawer 11 there is a weight indicating dial 14 with which is associated an indicating pointer 15 controlled by the scale in a manner later to be described.

Directly above the indicating dial 14 there is an actuating button 16. Toward the right hand side of the cabinet 10, as viewed in FIG. 1, there is a coin delivery chute 18 from which the coins delivered by the coin dispensing mechanism may be withdrawn by the vendor.

The rear of the drawer 11 is supported and guided by rollers 19 journalled on shafts 20 carried by brackets 21 fixed to the rear side portions of the drawer 11. The rollers 19 move freely along spaced parallel horizontal guideways 23. The guideways 23 are rigidly connected to the cabinet 10 by sloping front supports 24 and vertical rear supports 25.

Figure 2:
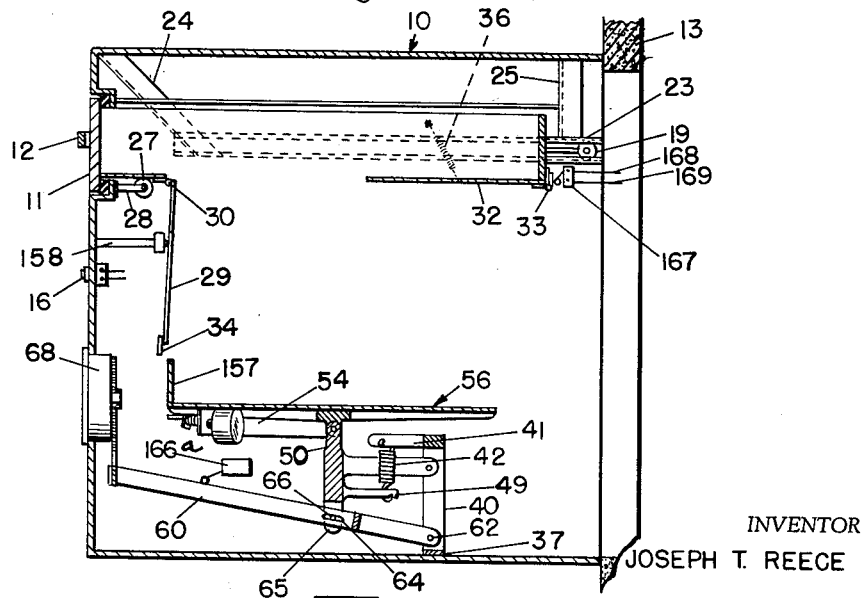
FIGURE 2 is a sectional view in elevation taken along the line 2—2 of FIGURE 1, looking in the direction of the arrows.

Rollers 27 carried by supports 28 engage the lower front portion of the drawer 11 when the drawer is in its closed position as shown in FIG. 2. The supports 28 are fixed to the front cabinet 10 immediately below the front opening for the drawer 11.

The bottom of the drawer 11 comprises a front panel 29 connected to the body of the drawer by a horizontal hinge 30. There is also a rear bottom panel 32 which is connected to the body of the drawer 11 by a horizontal hinge 33. The bottom front panel 29 is provided with an extension or lip 34 which underlies and supports the front edge of the rear panel 32 when the drawer 11 is open. The rear bottom panel 32 is normally held in its raised position by helical tension springs 36 which are connected between the outer lateral edges of the panel 32 and the lateral walls of the drawer 11 in the spaces between the guideways 23 and the drawer.

The scale comprises a base member 37 secured to the bottom of the cabinet 10 by bolts 38. An inverted U-shaped scale frame member 40 extends upwardly from the base member 37, the lower ends of the spaced parallel legs of frame member 40 being fixedly secured to the base member 37. A forwardly extending spring supporting arm 41 is integrally formed with the frame member 40. The rear end of arm 41 is joined to the central top portion of frame member 40. A weighing spring 42 of the helical tension type depends from the free end of arm 41.

A weighing member 44 comprises spaced parallel leg portions 45 interconnected by a transverse portion 46. The free ends of the leg portions 45 are connected to the spaced parallel legs of frame member 40 adjacent their upper ends by pivot pins 48. The weighing member 44 also comprises an integrally formed L-shaped arm portion 49 which extends downwardly from the center of transverse portion 46 and rearwardly below the leg portions 45. The free end of the L-shaped arm portion 49 is connected to and supported by the lower end of the weighing spring 42.

An integrally formed upright portion 50 is joined at its lower end to the center of transverse portion 46 of weighing member 44. At its upper end, the upright portion 50 is rigidly connected to a transversely extending supporting member 52. The ends of supporting member 52 terminate in upwardly extending lugs 53. A latching member 54 is rigidly connected to the center of supporting member 52 and extends forwardly therefrom below a weighing platform designated generally as 56. The weighing platform 56 comprises depending ears 57 which are connected to the lugs 53 by pivot pins 58.

A control member designated generally as 60 extends forwardly from the frame member 40. The control member 60 comprises rearwardly extending spaced parallel leg portions 61 which are connected to the lower end portions of the legs of frame member 40 by pivot pins 62. The forwardly extending portion of control member 60 comprises an arm having a longitudinally elongated slot 64 formed therein. Laterally spaced ears 65 depending from the front of L-shaped arm 49 straddle the arm portion of control member 60 adjacent to the slot 64. A pin 66, which may include an anti-friction roller, extends between the ears 65 and through the elongated slot 64 constraining the control member 60 to follow the movements of the weighing member 44.

The scale 14 and pointer 15 are mounted in an instrument housing 68. The pointer 15 is fixed on a shaft (not shown) which extends outwardly beyond the rear of the housing 68 and carries an exposed gear 69. A guide member 70 fixed to the housing 68 extends over the gear 69 and freely slidably holds a rack portion 72 of a vertically extending rod 73 in continuous meshing engagement with the gear 69. The lower end of the rod 73 is suitably connected to the front end of the control member 60 so that the rod 73 will move vertically in accordance with the displacements of weighing member 44 and control member 60, the pointer 15 being caused by the rack portion 72 to move through corresponding angular displacements.

A switch arm unit, designated generally as 75, is freely pivotally and axially slidably supported on a horizontal shaft 76. The shaft 75 is supported by a bracket member 77 comprising a base portion 79 and two spaced upright legs 80. The shaft 75 is suitably journaled in the upper ends of the legs 80, being appropriately held against axial movement. The base portion 79 is fastened to the bottom of the cabinet 10 by screws 81. A biasing spring 83 of the helical compression type yieldingly urges the switch arm unit 75 axially of the shaft 76 to maintain it disengaged from control contacts later described below so that the switch arm unit 75 may normally pivot on the shaft 76 substantially frictionlessly.

The switch arm unit 75 comprises a straight arm member 84 one end of which is suitably effectively frictionlessly linked to the forward end portion of the control member 60. The other end of straight arm member 84 carries a group of three movable contact units 85, 86 and 87.

Each of the contact units 85, 86 and 87 comprises a hollow exteriorly threaded cylindrical body portion 89 (FIGURE 14) which is threaded into the straight arm member 84 and held by a lock nut 90. The body 89 is provided with an inwardly directed shoulder 91. A flanged contact member 93 is freely axially slidable in the body 89 and its outward movement is limited by the shoulder 91, the outwardly projecting free end portion of the contact member 93 being engageable with a selected stationary contact as described below. The contact member 93 is outwardly spring pressed by a helical compression spring 94 one end of which abuts a closure screw 95 threaded into the body 89.

The switch arm unit 75 also comprises a brace or stiffening arm 97 one end of which is welded to the straight arm member 84 at 98. The stiffening arm 97 includes an extension 99 which is bent to extend parallel to the shaft 76 and which is welded to the straight arm member 84 at 100. A collar 102 is freely rotatable and axially slidable on the shaft 76 and engages the stiffening arm 97. The collar 102 is, in turn, engaged by an arm 103 fixed to the plunger rod 104 of a solenoid 105. The solenoid 105 is fastened to the bottom of the cabinet 10 by a strap 107 and screws 108. Energization of solenoid 105 forces collar 102 against stiffening arm 97 and moves the switch arm unit 75 axially on shaft 76 against the action of compression spring 83 to bring the contacts 85, 86 and 87 simultaneously into engagement with a selected radially extending row of fixed contacts as described in greater detail below. Deenergization of solenoid 105 disengages the contacts 85, 86 and 87 so that the switch arm unit 75 may pivot substantially frictionlessly on the shaft 76 under the influence of the control member 60.

An upright panel 109 formed of insulating material is fixed to the bottom of cabinet 10. The panel 109 is shown as being provided with series of fixed contacts arranged in arcuate rows concentric with the axis of shaft 76. The contacts are further arranged to lie on regularly angularly spaced radial lines passing through the axis of shaft 76 forming radial rows. In FIGURE 13, only eighteen contacts have been shown, the contacts being designated 111a through 116c. All of the contacts which lie on the outermost arcuate row have the suffix letter a and are engageable by the contact 85. All of the contacts on the next inwardly located arcuate row have the suffix letter b and are engageable by the contact 86. Similarly, all of the contacts with the suffix c are engageable by contact 87. All of the contacts with the prefix 111 lie in the first radial row and are simultaneously engageable with contacts 85, 86 and 87 in the first position of switch arm unit 75. Similarly, all of the contacts which are operative in the second position of switch arm unit 75 are designated with the prefix 112, those for the third position 113, and the others correspondingly designated consecutively.

In order to prevent engagement of the contacts 85, 86 and 87 simultaneously with the stationary contacts of two adjacent radial rows, there is a serrated collar member 118 which is freely rotatable on shaft 76. One end of the collar member 118 is fixedly connected to the stiffening arm 97 for rotation therewith and the other end has serrations 119 formed thereon. Another collar member 120 is mounted on shaft 76 and is held against rotation by suitable connection to the adjacent upright leg 80 of bracket member 77. The collar member 120 has serrations 119 of the collar member 118. The serrations 119 and 121 are of complementary triangular configuration with radially extending ridges which are regularly angularly spaced with the same spacing as the uniform angular spacing between adjacent radial rows of stationary contacts such as 111 and 112. The collar members 118 and 120 are surrounded by the helical biasing spring 83. The serrations 119 and 121 may engage and disengage each other without interfering with the action of the biasing spring 83.

When solenoid 105 is energized, the switch arm unit 75 may not move axially on the shaft 76 a sufficient distance to cause engagement between movable contacts 85, 86 and 87 and any of the stationary contacts 111a through 116c until there has been positive interengagement between the serrations 119 and 121. This engagement between serrations 119 and 121 will assume a definite position of alignment over a single radial row of stationary contacts and bridging action between two adjacent radial rows is positively prevented.

FIGURE 11 illustrates a coin dispensing unit which dispenses two coins simultaneously upon each actuation. An upright tubular coin magazine 123 contains a supply of coins 124 which are fed downwardly to the bottom of the magazine by gravity. A dispensing slide 125 is normally located below the magazine 123 and contains two stacked coins.

A solenoid 127 is provided with a plunger rod 128. An L-shaped bracket 129 is connected by a screw 130 to the slide 125. The vertical leg of the bracket 129 is connected by a cotter pin 132 to the plunger rod 128 of solenoid 127. A helical compression spring 133 surrounding plunger rod 128 yieldingly urges the dispensing slide 125 to its normal position as shown in FIGURE 11.

A bottom plate 134 supports the full weight of the entire stack of coins in the magazine 123. The bottom plate 134 is cut away as indicated at 135 to permit the controlled discharge of coins as explained below in connection with FIGURE 12.

FIGURE 12 illustrates a coin dispensing unit which dispenses a single coin upon each actuation. As in the case of FIGURE 11, it includes an upright coin magazine 137, a dispensing slide 138 and a solenoid 139. The slide 138 is shallower than the slide 125 so that it normally contains only a single coin. The bottom plate 133 is cut away at 135 permitting a coin to turn counterclockwise, as indicated in dotted lines, as soon as its trailing edge reaches the cut away portion at 135 and then drop into the coin delivery chute 18. As indicated in FIGURE 3, a plurality of coin dispensing units are arranged above the delivery chute 18, being mounted on a suitable supporting framework 141.

Figures 7, 8:
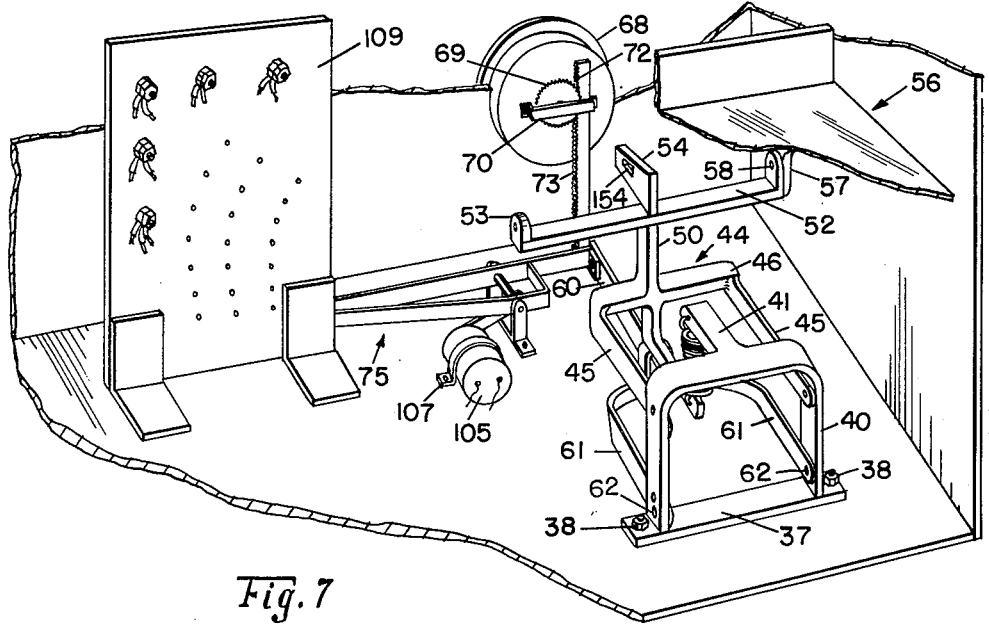
FIGURE 7 is a fragmentary perspective view showing the mechanical connections between the scale, the switch arm and the indicating dial.
FIGURE 8 is a bottom plan view of the weighing platform.

A solenoid 142 (FIGURE 8) is mounted on the underside of the weighing platform 56 by nuts 143. The solenoid 142 comprises a plunger rod 145 which is guided by a bracket 146. At its free end, the plunger rod 145 carries a connecting plate 147. A latching lever 149 is pivotally mounted intermediate its ends on a stud 150 fixed to the under side of the weighing platform 56. One end of the latching lever 149 is connected to the connecting plate 147 by a pivot pin 151. The other end of the latching lever 149 carries a latching finger 153. The latching member 54 has an elongated rectangular slot 154 formed therein in which the latching finger may be received. A helical compression spring 155 extending between bracket 146 and connecting plate 147 yieldingly urges the latching lever 149 to its normal position shown in solid lines in FIGURE 8. Energization of solenoid 142 causes the latching finger 153 to be withdrawn from slot 154 in latching member 54. Latching finger 153 is yieldingly biased so that it may re-enter slot 154 with solenoid 142 de-energized during gravity return of the weighing platform 56 to its normal horizontal position.

Figure 5:
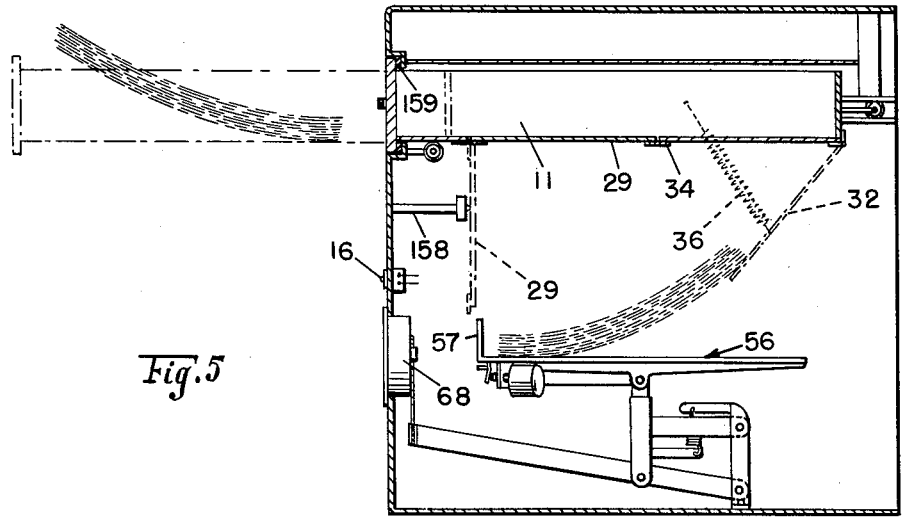
FIGURE 5 is a sectional view similar to FIGURE 2 illustrating the operation of the receiving drawer.
Figure 6:
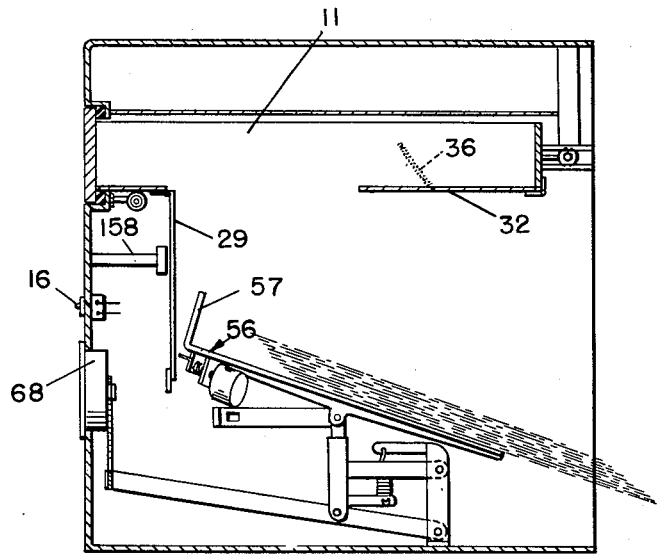
FIGURE 6 is similar to FIGURE 5 illustrating the discharge of the papers from the weighing platform.

The weighing platform 56 is normally unbalanced so that it tends to assume the horizontal position shown in FIGURE 5 in the absence of any load. When a sufficient load of papers is placed on the platform 56, however, it becomes unbalanced in the opposite direction and tends to tilt in the opposite direction to discharge the papers as shown in FIGURE 6. Energization of solenoid 142 causes the papers to be discharged by permitting the weighing platform 56 to tilt as shown in FIGURE 6. After discharge, the platform 56 returns by gravity to the position shown in FIGURE 5. The papers are prevented from assuming a forward position by an upstanding flange 157 integrally formed with the platform 56. A cushioned stop member 158 limits clockwise rotation of the front bottom panel of the drawer 11 when the drawer is closed. A strip of cushioning material 159 surrounds the opening through which the drawer 11 slides to provide a sealing action when the drawer is closed.

Referring to FIGURE 13, the switch arm unit 75 is shown arranged to assume any one of six positions after displacement from normal or zero weight position. Obviously, in practice, a greater number of positions will be provided. For simplicity of illustration, however, the number of positions has been limited to six, these positions being determined by the serrations 119 and 121 in collars 118 and 120, respectively. There are four coin dispensing units, two of which have solenoids 139 for dispensing a single coin and two of which have solenoids 127 for dispensing two coins at a time, as described above. The solenoid with control lead 161 dispenses a single one cent coin upon each actuation. The solenoid with control lead 162 simultaneously dispenses two one cent coins upon each actuation. The solenoid with control lead 163 similarly dispenses two cents upon each actuation. The solenoid with control lead 164 dispenses a single five cent coin upon each actuation. For convenience, these monetary values have been encircled in the respective control leads.

The power supply for operation of the device may be of any convenient type. For simplicity of illustration, it has been shown in the drawing as a grounded battery 166. It is to be understood that the battery 166 may be constituted by a transformer secondary winding, a rectifier, or other source of current.

A normally open off-normal switch 166a is shown in FIGURE 2 as being operatively associated with the control member 60. As soon as an appreciable load is placed on the weighing platform 54, the contacts of the off-normal switch 166a will close. In FIGURE 13, however, the off-normal switch 166a is diagrammatically illustrated as being directly controlled by the weighing platform 56.

In FIGURE 2, a drawer closure switch 167 is shown provided with leads 168 and 169 which are connected as shown in FIGURE 13. When the drawer 11 is fully closed, the contacts of switch 167 are closed but they are otherwise open whenever the drawer 11 is displaced from its fully closed position.

In operation, a user of the purchasing machine pulls the drawer 11 open. This causes rollers 27 to engage front bottom panel 29 and bring it to a horizontal position as indicated in dot-dash lines in FIG. 5. The extension or lip 34 then engages the front edge of the rear panel 32 thereby positively holding it in the horizontal position. Papers are then placed in the drawer 11 and the drawer is pushed closed. When the drawer 11 approaches its closed position, the front bottom panel 29 falls open by gravity and the front portions of the papers drop onto the weighing platform 56, the papers being retained by the upstanding flange 157. The rear panel, no longer being supported by the extension 34, swings downwardly under the weight of the papers against the yielding action of the springs 36. The papers are thereafter completely supported by the weighing platform 56 and the rear panel 32 is urged back to its horizontal position by the springs 36. The front panel 29 remains lowered. The pointer 15 then indicates the weight of the papers on the platform 56.

At the same time, the switch arm unit 75 has assumed angular position determined by the weight on the platform 56 which may or may not be aligned along a particular radial row of fixed contacts 111a–116c. The user then presses the actuating button 16. This energizes the weighing platform solenoid 142 permitting the platform 56 to tilt rearwardly and discharge the papers as indicated in FIGURE 6. After discharging the papers, the platform 56 returns by gravity to its initial position ready to receive the next batch of papers.

Simultaneously with the energization of platform solenoid 142, solenoid 105 is energized drawing switch arm unit 75 toward the stationary contacts 111a–116c. The serrations 119 and 121 of collars 118 and 120 are forced into engagement and the position of switch arm unit 75 is shifted, if necessary, to bring it into alignment with the single radial row of contacts giving the nearest correspondence to the actual weight of the papers on the weighing platform 56. When the switch arm unit 75 is moved rearwardly by solenoid 105, the corresponding coin dispensing solenoids are energized and the coins are dropped into the chute 18 from which they may be removed by the vendor. In the meantime, the scale platform will have returned to its normal position opening the contacts of the off-normal switch 166 and preventing the repeated dispensing of coins by re-operation of the actuating button 16.

While but one form of the invention has been shown and described herein, it will be readily apparent to those skilled in the art that many minor modifications may be made without departing from the spirit of the invention or the scope of the appended claims.

What is claimed is:

1. A purchasing machine of the class described, comprising: a housing, a receiving drawer means in said housing movable between open and closed positions, said drawer means being dimensioned to receive material to be purchased therein when said drawer is in said open position; weighing means within said housing, said weighing means comprising platform means located below said drawer when said drawer is in said closed position; coin dispensing means controlled by said weighing means; means for discharging the contents of said drawer means upon said platform means; and means responsive to the presence of a weight on said platform means for causing actuation of said coin dispensing means.

2. A purchasing machine according to claim 1, further comprising means included in said last named means and actuated by said drawer means for preventing actuation of said coin dispensing means except when said drawer means is in said closed position.

3. A purchasing machine according to claim 1, further comprising means controlled by said last-named means and acting on said platform means for discharging said contents from said platform means.

4. A purchasing machine of the class described, comprising: weighing scale means for receiving material to be purchased; electrically operable discharge means acting on said scale means for discharging material from said scale means; electrical switching means actuated by said scale means in accordance with the weight of said material; coin dispensing means controlled by said switching means; an energizing circuit; and control means included in said energizing circuit for energizing said coin dispensing means through said switching means and for energizing said discharge means.

5. A purchasing machine according to claim 4, wherein said switching means comprises: a plurality of stationary contacts; switch arm means mounted for angular movement about a predetermined axis, the angular position of said switch arm means being controlled by said scale means, said contacts being arranged in radially spaced arcuate rows concentric with said axis of said switch arm means, said stationary contacts being further aligned along regularly angularly spaced lines converging at said axis; a plurality of radially spaced movable contacts carried by said switch arm means, all of said movable contacts being simultaneously engageable with all of the stationary contacts aligned along a common radial line when said switch arm means is directed in the same direction as said common line; said coin dispensing means comprising a plurality of coin dispensing units connected to said stationary contacts for dispensing coins in a different total monetary value for each group of radially aligned contacts; said switching means further comprising means energizable from said energizing circuit in response to operation of said control means for producing axial movement of said switch arm means to bring said movable contacts into simultaneous engagement with a group of stationary contacts aligned along a common radial line for energizing said coin dispensing units from said energizing circuit in response to actuation of said control means.

6. A purchasing machine according to claim 5, further comprising a movable collar member concentric with said axis and fixed to said switch arm means for both axial and angular displacement therewith, and a stationary collar member concentric with said axis, said collar members having normally axially spaced confronting serrations formed thereon, said serrations being regularly angularly spaced around said axis with the same spacing as said radial lines, axial movement of said switch arm by said means energizable from said energizing circuit causing interengagement between the serrations of said collars accompanied by positive alignment of said movable contacts along a single particular row of stationary contacts aligned on a common radial line for simultaneous engagement therewith.

7. A purchasing machine of the class described, comprising: housing means; receiving means in said housing means, said receiving means being operative for receiving material to be purchased externally of said housing means and delivering the same internally thereof; weighing means in said housing means for weighing said material delivered by said receiving means; discharge means for removing said material from said weighing means after the weighing thereof; switching means controlled by said weighing means; a plurality of coin dispensing units connectable by said switching means to dispense coins of a total monetary value determined by the weight of said material on said weighing means; an energizing circuit common with said discharge means, said switching means and said coin dispensing units; and control means in said energizing circuit for actuating said coin dispensing units through said switching means and actuating said discharge means.

8. A purchasing machine according to claim 7, wherein said plurality of coin dispensing units comprises at least one unit which dispenses a single coin upon each actuation thereof and at least one unit which dispenses a plurality of coins upon each actuation thereof.

9. A purchasing machine according to claim 7, wherein said weighing means comprises a tiltable platform upon which said material is received, said platform, when unloaded, being urged to assume a horizontal position and when loaded being urged to tilt for discharging said material therefrom, said discharge means comprising electromagnetic latching means normally retaining said platform in its horizontal position, said electromagnetic means being energizable by said control means to release said platform whereby said platform may tilt to discharge said material therefrom.

10. A purchasing machine according to claim 7, in which said receiving means comprises a drawer movable horizontally between open and closed positions, said drawer, in its closed position being located above said weighing means, said drawer having a bottom panel which is movable with said drawer in its closed position to permit delivery of said material by gravity to said weighing means.

11. A purchasing machine according to claim 10, further comprising switch means included in said energizing circuit, said switch means being actuated by said drawer except in the closed position thereof to prevent actuation of said coin dispensing units by said control means.

References Cited in the file of this patent
UNITED STATES PATENTS
3,112,019    Simjian _____ Nov. 26, 1903